United States Patent
Boroditsky et al.

(10) Patent No.: US 6,327,659 B2
(45) Date of Patent: Dec. 4, 2001

(54) GENERALIZED USER IDENTIFICATION AND AUTHENTICATION SYSTEM

(75) Inventors: Marc D. Boroditsky, New York; Marc B. Manza, Lindenhurst, both of NY (US)

(73) Assignee: Passlogix, Inc., New York, NY (US)

( * ) Notice: Subject to any disclaimer, the term of this patent is extended or adjusted under 35 U.S.C. 154(b) by 0 days.

(21) Appl. No.: 09/781,062

(22) Filed: Feb. 9, 2001

Related U.S. Application Data (63) Continuation of application No. 09/076,375, filed on May 12, 1998.
(60) Provisional application No. 60/046,289, filed on May 13, 1997.

(51) Int. Cl.$^7$ .................................................... G06F 11/30
(52) U.S. Cl. ........................ 713/182; 713/168; 713/170; 380/258
(58) Field of Search ................................. 713/182, 168, 713/170, 176, 200, 201; 380/258

(56) References Cited

U.S. PATENT DOCUMENTS

| | | | |
|---|---|---|---|
| 4,652,990 | 3/1987 | Pailen et al. | 364/200 |
| 4,720,860 | 1/1988 | Weiss | 380/23 |
| 5,168,520 | 12/1992 | Weiss | 380/23 |
| 5,237,614 | 8/1993 | Weiss | 380/23 |
| 5,241,594 | 8/1993 | Kung | 380/4 |
| 5,276,314 | 1/1994 | Martino et al. | 235/380 |
| 5,339,403 | 8/1994 | Parker | 395/425 |
| 5,361,062 | 11/1994 | Weiss et al. | 340/825.33 |
| 5,416,840 | 5/1995 | Cane et al. | 380/4 |
| 5,465,084 | 11/1995 | Cottrell | 340/825.31 |
| 5,479,512 | 12/1995 | Weiss | 380/28 |
| 5,485,519 | 1/1996 | Weiss | 380/23 |
| 5,550,968 | 8/1996 | Miller et al. | 395/157 |
| 5,586,260 | 12/1996 | Hu | 395/200.2 |
| 5,604,490 | 2/1997 | Blakley, III et al. | 340/825.31 |
| 5,657,388 | 8/1997 | Weiss | 380/23 |
| 5,706,349 | 1/1998 | Aditham et al. | 380/25 |
| 5,821,933 | 10/1998 | Keller et al. | 345/348 |

FOREIGN PATENT DOCUMENTS

| | | | |
|---|---|---|---|
| 0633519 A1 | 1/1995 | (EP) | G06F/3/033 |
| 0677801 A1 | 10/1995 | (EP) | G06F/1/100 |

OTHER PUBLICATIONS

Matsumoto,T., *Human–Computer Crytography: An Attempt*, 3rd. ACM Conference on Computer and Communications Security, (New Delhi), Mar. 14–16, 1996, Conf. 3, Mar. 14, 1996, pp. 68–75 (XP000620978).

Anonymous, *Menu Item With Cipher Lock*, Research Disclosure, No. 321, Jan. 1991, p. 63 (XP000164443).

Chang, Chin–Chen et al., *Cryptographic Authentication of Passwords*, Proceedings of the $25^{th}$ Annual IEEE International Carnahan Conference on Security Technology, (Taipei, Taiwan, ROC), Oct. 1–3, 1991, pp. 126–130 (XP000300420).

*Primary Examiner*—Thomas R. Peeso
(74) *Attorney, Agent, or Firm*—Testa, Hurwitz & Thibeault, LLP (57) ABSTRACT

The invention features a method for providing a user access to a secure application. The invention stores in an encrypted form the authentication information necessary to satisfy the authentication requirements of the secure application. When the user requests access to the secure application, the user is presented at his or her display with a request for authentication. The user must manipulate at least a portion of the symbol to respond properly to the authentication request. The user's manipulation(s) of the symbol(s) generate a CodeKey used to decrypt the encrypted stored authentication information into a result. After the result is created, it is provided to the secure application. If the result support's the secure application's authentication requirements (i.e., if the CodeKey has properly decrypted the encrypted stored authentication information), the user will be granted access to the secure application.

21 Claims, 11 Drawing Sheets

GENERALIZED USER IDENTIFICATION AND AUTHENTICATION SYSTEM

RELATED APPLICATIONS

This application is a continuation of United States patent application Ser. No. 09/076,375, filed May 12, 1998, which claims priority to United States Provisional Application Serial No. 60/046,289 filed on May 13, 1997, the contents of both of which are herein incorporated by reference.

FIELD OF THE INVENTION

The invention relates generally to methods for verifying the identity of a user of a secure application. More particularly, the invention relates to a method for verifying the identity of a user accessing one or more secure applications or systems, such as a computer, on-line service, automated transaction mechanism, and the like.

BACKGROUND OF THE INVENTION

Many electronic systems are in use that require a user to identify himself before being granted access to the system. These systems include computer networks, automated teller machines (ATM's), automated databases such as LEXIS™, banking systems, electronic mail systems, on-line providers such as America On-Line (AOL)™, stock-trading systems, educational institutions, payroll accounts, and a great variety of additional applications. To ensure that the information on these systems is protected from tampering, destruction, or misuse, most of these systems employ some type of security. Security is especially important when information is made easily available to a large community of potential users in multiple locations on networks.

System security typically can include physical, procedural, and technical mechanisms. However, most systems rely on one or more of three basic methods of identification and authentication, each of which requires something of the Prover (the terms "Prover" and "user" are used interchangeably throughout the Specification):

something the Prover knows (e.g., name and password);
 something the Prover has (e.g., identity badge); or
 something the Prover is (e.g., finger print).

Security systems commonly rely on something the Prover knows even when applying something the Prover has. The most widely applied approach to "something known" is the use of name and password in computer systems. Even recent security improvements (e.g., smart cards, firewalls, digital signatures) rely on traditional passwords and user ID's to identify and authenticate users when granting access.

Most authentication methodologies rely on the presence of a complete set of authentication information at every stage of the process (e.g., name and password). The typical process is that the user knows the complete set of authentication information, and inputs the complete set into a computer or terminal. The complete set is transmitted to a secure application and compared there to a set of stored authentication information. At each stage of the process, the necessary complete set of authentication data is exposed to interception and possible unauthorized use. This is especially true in the case of networked computer environments.

To ensure good security, passwords must be difficult to guess or decipher. Thus, users are advised to avoid "weak" passwords such as names (e.g., that of one's spouse, pet); easily obtained information (e.g., phone number, birthday); dictionary words; the same password for multiple systems, etc. To reduce the threat of unauthorized access, computer security experts often recommend that a user password contain only mixed letters and numbers in seemingly random strings (e.g., 87SFs81R9) and that it be changed often. Undetected unauthorized access could easily occur when a password is discovered, intercepted, or guessed.

The problems with such an approach are twofold. First, because human users typically find it easier to remember passwords that have a context to the user (e.g. a word or date), the passwords they choose typically are not difficult to guess. A study of the range of passwords chosen by computer operators found that one third of all user passwords could be found in the dictionary. Such passwords are vulnerable to commonly available software that can try every word in the dictionary as a password.

Second, the problem of "password overload" is resulting in many breaches of carefully planned security techniques. An increasing number of applications require that users follow an authentication process that typically includes presenting some form of a name and password to gain access. If users comply with security standards, they must memorize a seemingly random string of letters and numbers for each application. Further, most secure applications have their own interfaces and may require something unique of the user. Some review users' passwords and restrict the type of password that the user can use and how long the password may be valid. However, the vast majority of applications do nothing to simplify the process for users and instead make it more complex.

Ultimately, the difficulty with remembering a multitude of passwords for a multitude of applications encourages users toward bad habits. Users select weak passwords, share them, and maintain vulnerable password lists, often sticking passwords directly onto their computer. In effect, users themselves are the weakest link in most secure applications and systems, making the systems vulnerable to easy breach and unauthorized access.

Thus, there is a need for a type of password authentication system that can satisfy the two seemingly conflicting goals of being easy for the user to remember and difficult for anyone else to figure out.

One prior art solution to solving this problem is the technique known as "single logon" or "single sign-on," typified by U.S. Pat. No. 5,241,594. In this technique, a user logs on to his or her user computer just once, using a conventional user ID and password. When the user needs to access a remote computer or application, the ID and password that the user just entered are encrypted and transmitted to the remote computer, using a secure transport layer protocol between the user's computer and the remote computer. The secure transport layer protocol is established either using special software on the user's computer or using a separate server. The encrypted password is then compared to a database of encrypted passwords stored in a central location, typically on the server or the remote computer. In addition, all systems that the user wants to access must use the same password.

However, the requirement that every computer or application in the system (i.e., the user computer and all remote computers) have the same password means that this technique may not work for all systems. This method may be unusable with remote computers or applications having complicated or atypical authentication requirements. Thus, many single sign-on applications are compatible with a limited number of applications. Moreover, most commercially available versions of single sign-on systems utilize the separate server method, which complicates and adds expense to the authentication process. Additionally, many commercially available systems require that all compliant applications use the same security protocols, hardware interfaces, etc., limiting the applicability of such systems. Therefore, there exists a need for a simple, yet secure, authentication system that does not require additional hardware and will work with systems having varied authentication techniques and requirements.

SUMMARY OF THE INVENTION

The invention provides users with a single, simple method of authentication that replaces traditional name and password approaches and is compatible with varied authentication requirements. The invention allows Verifiers ("Verifier" and "secure application" are used interchangeably throughout the specification) to securely authenticate Provers and allows Provers to be authenticated by multiple Verifiers. The invention applies a process that requires a Prover to complete only one set of easy-to-recall routines or Prover steps. These Prover steps initiate the appropriate authentication process for each Verifier without further intervention or input from the Prover. Thus, Provers have a single, unified method for all their authentication requirements, because the invention handles the subtleties associated with each secure application.

In one respect, the invention features a method for providing a user access to a secure application. The method includes storing in an encrypted form the authentication information necessary to satisfy the authentication requirements of the secure application. By way of example only, this information can be stored on a user's computer. When the user requests access to the secure application, the user is presented at his or her display with a request for authentication. Unlike traditional name and password approaches, however, the authentication request presented to the user comprises at least one symbol. The user must manipulate at least a portion of the symbol to respond properly to the authentication request. By way of example only, the invention could display to the user a display of a table, a plate, and a plurality of edible items. The user selects several edible items (to make a "meal") and moves them to the plate. These manipulations, which may or may not be order sensitive, are the only steps that the user need recall. The "secret meal" is easy for the user to recall, but difficult for another to guess. Further, the "secret meal" is the same regardless of the secure application being accessed.

The invention includes the step of using the user's manipulation(s) of the symbol(s) to generate a CodeKey. This CodeKey is used to decrypt the encrypted stored authentication information into a result. Each secure application or log-on session can require a different expected result, but only the user will know his/her Prover steps. The user never knows (and, in fact need not know) any of the expected results or how to derive them. In addition, the secure application never knows (and need not know) the Prover Steps (i.e., manipulation or series of manipulations) or how to derive them.

After the result is created, it is provided to the secure application. If the result supports the secure application's authentication requirements (i.e., if the CodeKey has properly decrypted the encrypted stored authentication information), the user is granted access to the secure application.

The invention provides a simple, secure and effective method for a user to gain access to a multitude of secure applications without having to recall a series of complicated passwords. Unlike prior art single sign-on systems, the invention eliminates the entry, transmission, or storage of a static, complete set of authentication data at any stage of the authentication process. The invention requires no additional hardware and does not require that all secure applications being accessed use the same authentication requirements.

BRIEF DESCRIPTION OF THE DRAWINGS

These and other features of the invention are more fully described below in the detailed description and accompanying drawings of which the figures illustrate a method for providing a user access to a secure application.

DETAILED DESCRIPTION OF THE INVENTION

In the following detailed description of the invention, reference is made to the following terms. Where noted, certain of these terms are used interchangeably with certain others throughout the Specification.

Prover is defined as an individual attempting to gain access to a secure application or Verifier. A Prover is also referred to as a "user." Prover Steps are defined as the personal sequence of steps chosen by a Prover. The Prover Steps are based on one or more symbols displayed to the user and a sequence of moves or manipulations of these symbols executed by the Prover. A Symbol is defined as a graphical or visual object, but it should be understood that anything that can be visually displayed and can be selected, moved, or manipulated in any manner could be used as a symbol for the purposes of the invention. A Verifier is defined as the application, system, computer, server, etc., to which a Prover is attempting to gain access. Any entity that is secure and requires authentication for a user to gain access to it can be a Verifier. Verifier is used interchangeably with "secure application" throughout the Specification. Authentication is defined as the process of validating a claimed identity, such as the identity of a Prover. Authentication Information is defined as the information that must be provided to a Verifier for a Prover to gain access. Authentication information can be anything from one or more usernames and passwords to a multitude of complex routines, procedures and information. A Challenge is defined as a visual presentation that requires the Prover to make input and complete the actions that comprise his or her Prover Steps. A Challenge also is referred to as an "authentication request." A CodeKey is defined as a key that can be used to decrypt authentication information that has been encrypted.

Figure 1:
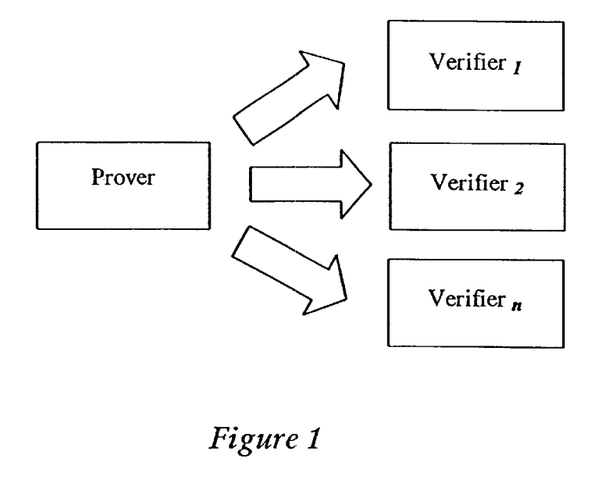
FIG. 1 is a block diagram illustrating that the invention supports multiple Verifiers for each Prover.

FIG. 1 is a block diagram providing a general overview that the invention supports multiple Verifiers for each Prover. A user, by selecting one of the Verifiers of FIG. 1, begins the steps shown generally in FIG. 2 and more particularly in FIGS. 7–21.

Figure 2:
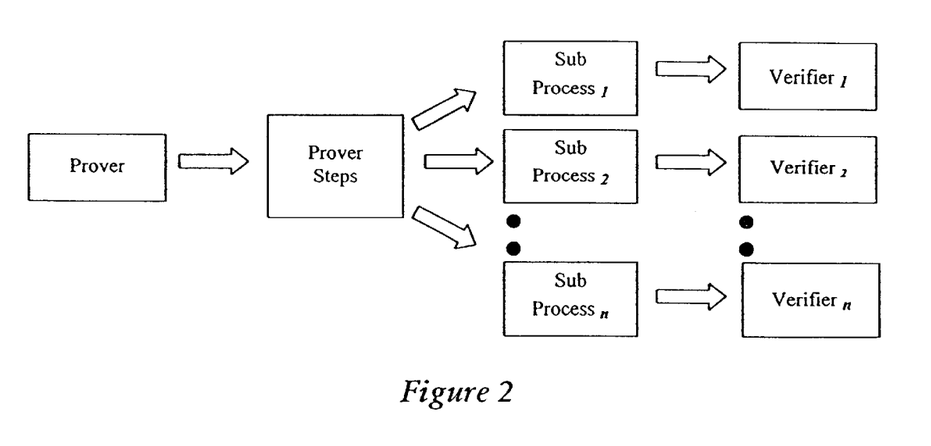
FIG. 2 is a block diagram illustrating the sequence between a Prover's execution of Prover Steps and activation of the appropriate Verifier-specific sub-processes.

FIG. 2 is a block diagram illustrating generally the sequence of steps required for a Prover to gain access to a Verifier. Verifiers 1 through N each require a separate and unique process, illustrated in FIG. 2 as sub-process$_1$, through sub-process$_n$, respectively, for a Prover to gain access. A sub-process can be as simple as providing a username and password, as is common with many on-line systems. However, a sub-process also can comprise a series of passwords or codes, or other application-specific requirements. Regardless of the complexity of the sub-process required for a particular Verifier, when a Prover wants access to the Verifier, the Prover only needs to execute his or her Prover Steps to initiate the appropriate process for a particular Verifier, as shown in FIG. 2.

As a preliminary action, the Prover indicates to the system implementing the invention: (a) the Prover Steps that the Prover will use to access all secure applications (roughly corresponding to a "symbolic password" that the user must remember); and (b) the Verifier and associated authentication information (roughly corresponding to the secure application and its associated password).

To designate Prover Steps, a user is presented with a display of objects or symbols. Arranging, moving or sequencing the objects or symbols completes the Prover's steps. Preferably, the object or symbols are familiar to the user. For example, a user who is a chemist may choose to be presented with a display of the periodic table of elements. The chemist may then select several elements, or put elements together to create a formula or molecule, or create another combination that would be easy for the chemist to remember without writing it down. The selection may or may not be order sensitive.

Other possibilities might be food items to a chef, stocks to a financial analyst, a deck of cards to a card player, etc. It can be appreciated that an innumerable variety of displays of objects, and combinations thereof, could be contemplated to be within the spirit and scope of the invention, and the aforementioned suggestions are by no means exhaustive.

FIGS. 3A and 3B show a simplified view of non-order-sensitive layout created from a series of three Prover Steps. In FIG. 3A, two objects "X" and "Y" are displayed to the user, along with a tic-tac-toe-like grid to which either or both objects could be moved. The three Prover Steps are indicated by the three dashed lines emanating from the "X" object. Because this particular set of Prover Steps is non-order-sensitive, any series of Prover Steps that result in a layout resembling 3B could satisfy a challenge (i.e., FIG. 3A) based on these Prover Steps.

In contrast, FIGS. 4A–4C show a simplified view of an order-sensitive series of Prover Steps. FIG. 4A shows Prover Step 1, FIG. 4B shows Prover Step 2, and FIG. 4C shows Prover Step 3. FIG. 4D provides a table comparing the layouts resulting from the non-order-sensitive Prover Steps of FIGS. 3A–3B and the order-sensitive Prover Steps of FIGS. 4A–4C. For order-sensitive Prover Steps, each Prover Step will correspond to a layout, as shown in FIGS. 4A–4C. For non-order sensitive Prover Steps, the layout, as shown in FIG. 3B, corresponds to the final result of all Prover Steps.

In one embodiment of the invention, the series of Prover Steps alone are used as an easy to remember password for access to a secure application. The layout or series of layouts are stored in a location accessible to the secure application, so that when a Prover seeks access to the secure application, a challenge could be presented displaying the symbols to the user and requiring the user to replicate the user's previously designated password. The password layout information further could be encrypted so that only the secure application can decrypt it for comparison to the user's challenge response. However, it is preferred that the series of Prover Steps, and corresponding layout instead be used to form a CodeKey to decrypt authentication information necessary to access a secure application, as will be described more fully herein.

Figure 3:
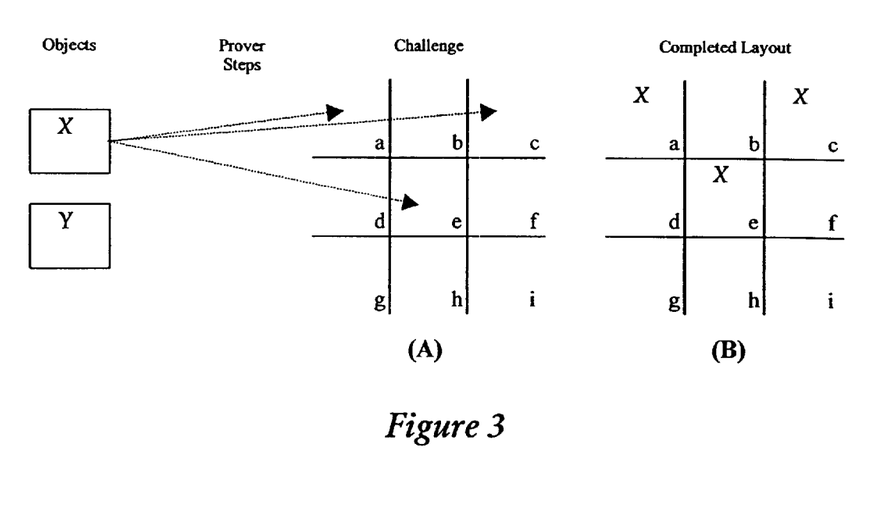
FIGS. 3A–B illustrate examples of a non-order-sensitive-series of Prover Steps that could be used as a Challenge.
Figure 4:
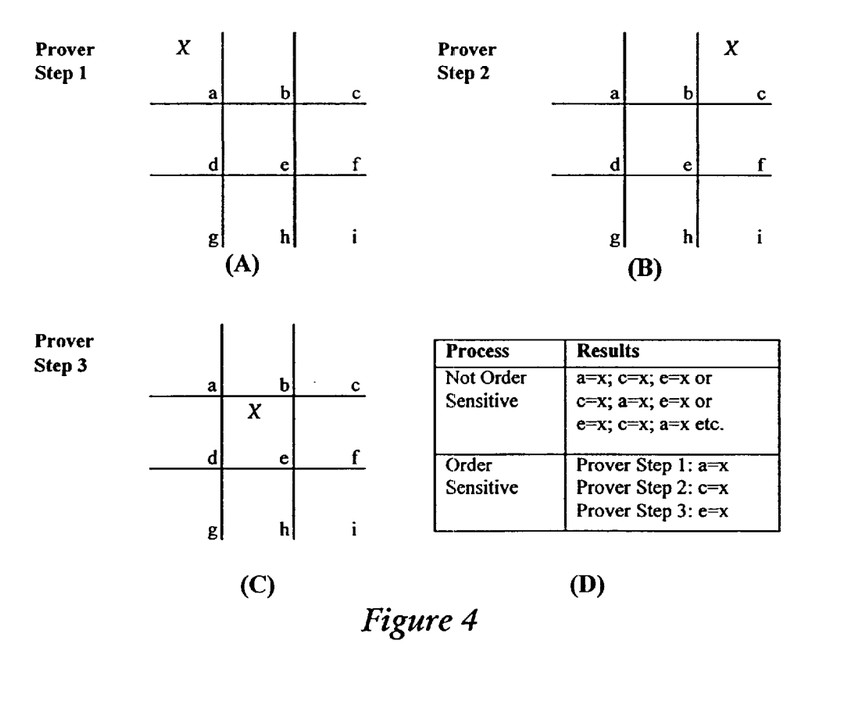
FIGS. 4A–D illustrate an example of an order-sensitive-series of Prover Steps that could be used as a Challenge.
Figure 5:
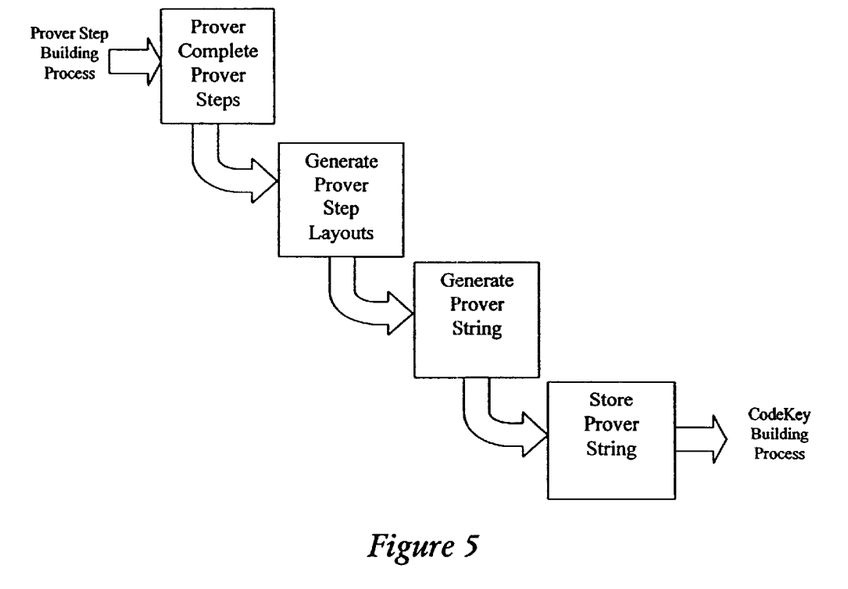
FIG. 5 is a flow chart illustrating the steps in accepting Prover Steps that a user has selected and converting them to a String.

After the layout or series of layouts are generated, the system implementing the invention uses the resulting layout or layouts to generate a String that will be used later to build a CodeKey. FIG. 5 illustrates the Prover Step Building Process. After the user provides a series of Prover Steps as illustrated in FIGS. 3 and 4, the Prover Step Building Process of FIG. 5 generates a layout based on the Prover Steps. The layout contains generally the type of information shown in FIG. 4D. Next, this process mathematically combines the selections, objects and actions represented by the layout to produce a String corresponding to the series of Prover Steps. Typically, this String is in the form of a binary string. The String generated is specific to the order sensitivity of Prover Steps, the arrangement of symbols or objects used, and the sequence of Prover steps. The String is stored so that it can later be used (see FIG. 9) to produce a CodeKey. Note also that a Prover has the option of changing his or her Prover Steps at any time by repeating the Prover Step Building Process of FIG. 5.

In a preferred embodiment, the String is stored on the computer of the user in a location and manner such that the String is inaccessible to secure applications to which the user is seeking access. This helps to ensure that a complete set of authentication information is not transmitted to secure applications. However, in other embodiments, it is possible to store the String on a location other than the user's computer yet still inaccessible to secure applications, such as a remote computer or server. It also is possible to store the String on a portable storage medium, such as a floppy disk, to permit the user to have the benefits of the invention on any computer being used. Another possibility is to store the String on a computer network in a location "hidden" from other users.

Figure 6:
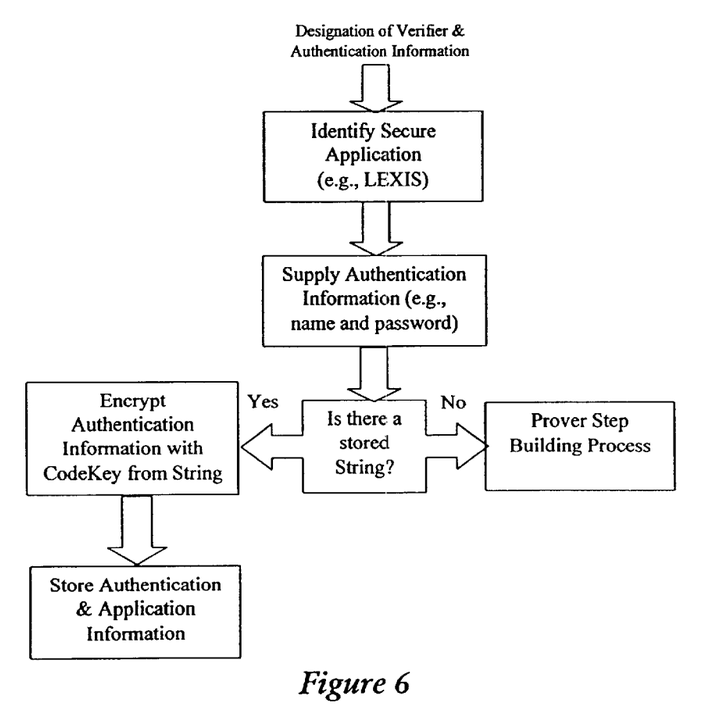
FIG. 6 is a flow chart illustrating the steps for designating a Verifier and its authentication information.

FIG. 6 illustrates another preliminary process in using the invention, involving the one-time designation of the authentication requirements associated with a particular application. To accommodate a Verifier's particular authentication requirements, the invention allows users to designate ahead of time the Verifer and its authentication requirements. This typically is done after the user has chosen his or her Prover Steps, as was illustrated in FIGS. 3, 4, and 5. However, as FIG. 6 shows, it is possible for a Prover to interrupt the Verifier designation process and chose the Prover Steps at the time a Verifer is designated, if the user has not already done so.

An example can help to illustrate the workings of the process shown in FIG. 6. Suppose a user has been issued a username and password for the LEXIS™ on-line service. The user wants to add this secure application to the system implementing the invention, having already completed the steps of FIG. 5. First, the user designates the particular secure application (i.e., "LEXIS™"). This is done so that the system implementing the invention can properly configure the authentication information that the user will provide, to ensure that authentication information will be compatible with the requirements of the secure application. Preferably, this designation is made via a simple, user-friendly interface, such as a pull-down menu or selection from a list of applications. However, it is contemplated that many methods of designating applications, including manually entering the name of the application or receiving application information from an external source, are possible. It is further contemplated that, in future embodiments, a system implementing the invention may be able to automatically detect and determine the application that the user wants to designate.

Next, as shown in FIG. 6, the user supplies the appropriate authentication information for the secure application. In this example, the user could provide a LEXIS™ username and password, such as "Jsmith, ab2dc3e." This is the only time that the user needs to remember the authentication information for that application. After the user provides this authentication information, the invention uses the String (from FIG. 5) to generate a CodeKey used to encrypt the authentication information. The CodeKey itself is never stored; all that is stored is the String (as was noted previously) and the encrypted Verifier authentication information. In a preferred embodiment, the encrypted Verifier authentication information is stored in a location inaccessible to the Verifier, such as on the user's computer. However, the alternatives available for storage of the String also are applicable to storage of the encrypted Verifier authentication information.

The encryption method used with the CodeKey preferably is a non-reversible one-way function such as a one-way hash function. However, it should be understood that one skilled in the art would contemplate additional workable encryption techniques.

The process of generating a String and a CodeKey from the String, and of encrypting the authentication information, help ensure that the Prover Steps, layouts, and authentication information cannot easily be deduced. In addition, with this process the CodeKey can be unique for each application and log-on session.

Figure 7:
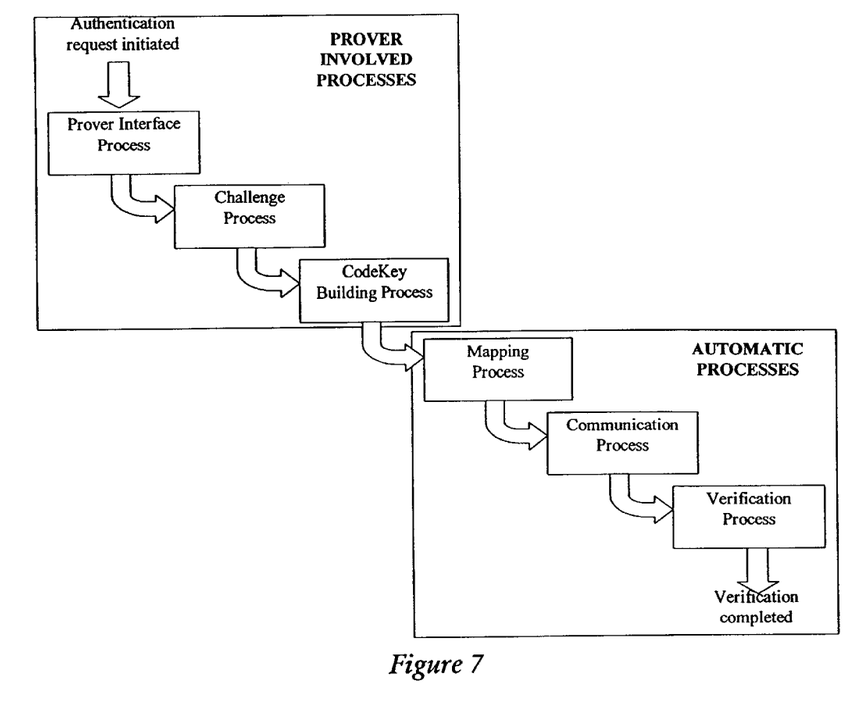
FIG. 7 is a flow chart illustrating the sequence of sub-processes involved in the process from Prover initiation through Verifier authentication.

FIG. 7 provides an overall view of the steps involved in a preferred embodiment of the invention. These steps chronicle the events that occur when a user who has already completed the steps of selection of Prover Steps (FIG. 5) and Verifier Designation (FIG. 6), seeks to gain access to the Verifier.

Generally, the invention provides Provers with a single, simple method of authentication that replaces traditional name and password approaches. It allows Verifiers to securely authenticate Provers and allows Provers to be authenticated by multiple Verifiers. Most Verifiers require a separate and unique process (i.e., most Verifiers have unique authentication requirements). To grant access to the Verifier, the invention requires the Prover to complete one set of routines or Prover Steps. Provers need execute only their Prover Steps to initiate the appropriate process for each Verifier.

The invention supports a number of different authentication methods. Prover authentication is accomplished based on the combined results of the Prover Steps and the appropriate process or sub-process for the application being accessed. The invention follows a single sequence, shown generally in FIG. 7, that initiates the appropriate sub-process for each Verifier's specific requirements. The series of steps for the invention, once initiated, require no further intervention or input from the Prover. In effect, the Prover need only select the Verifier or secure application for access and complete his or her Prover Steps. The Prover is provided a single unified method for all their authentication requirements. The Process handles the subtleties associated with each application or system.

The steps shown in FIG. 7 are applied to all secure applications to which a user seeks access and are initiated for each unique authentication based application or system. In general, Prover input in the Prover Interface Process and Challenge Process would be used to build a key ("CodeKey") in the CodeKey Building Process. This CodeKey corresponds to the same CodeKey that was derived in FIG. 6 from the Prover Step Building Process of FIG. 5. The invention then "maps" to the Verifier specific sub-process based on the application being accessed by the Prover. This Mapping Process would examine the CodeKey and generate appropriate outcomes to be transmitted to the Verifier in the Communication Process. The Communication Process may be a single exchange, or series of iterative exchanges. Greater detail on each step of FIG. 7 is provided below.

The steps of the invention, as shown in FIG. 7, comprise two major sets of steps: Prover Involved Processes; and Automatic Processes. The Prover Involved Processes are initiated by and require the input of the Prover. The Automatic Processes are initiated by the completion of the Prover involved Processes and require no further input from the Prover.

Prover Involved Processes

The Prover involved steps are initiated by a Prover request for authentication and require Prover input to complete. The sequence includes the Prover Interface Process, the Challenge Process, and the CodeKey Building Process.

Prover Interface Process

Figure 8:
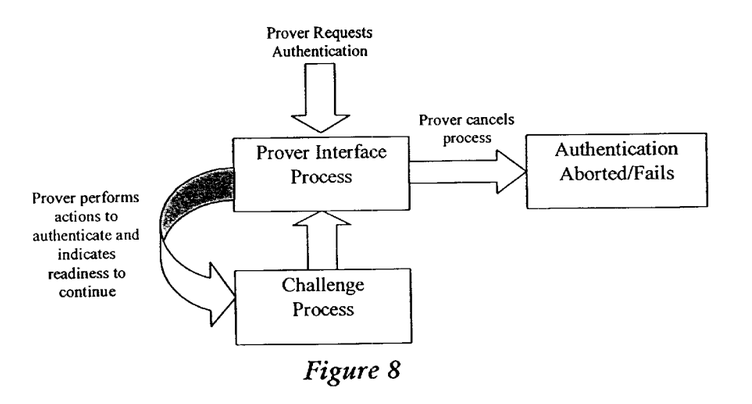
FIG. 8 is a flow chart illustrating the start up of the Process and the steps for initiation of the subsequent Challenge Process.

As shown in FIG. 8, the Prover Interface Process is the initial step in the overall Process and encompasses the steps necessary to set up the Challenge Process. The Prover Interface Process is initiated by a Prover request for authentication. This request can come from various sources including, but not limited to, resource controllers, access providers, and manual and automatic processes. The Prover Interface Process presents and contains Prover challenges.

Once initiated, at any point during the Prover Interface Process, the Prover can cancel/abort the authentication process. The cancellation process is by explicit action on the part of the Prover. Cancellation aborts the Process and authentication fails. At any point during the Prover Interface Process, the Prover can indicate that all Challenge responses are complete and authentication should continue. This does not indicate successful authentication. It only indicates that the Prover believes that a complete set of responses have been supplied to the Challenges.

Figure 9:
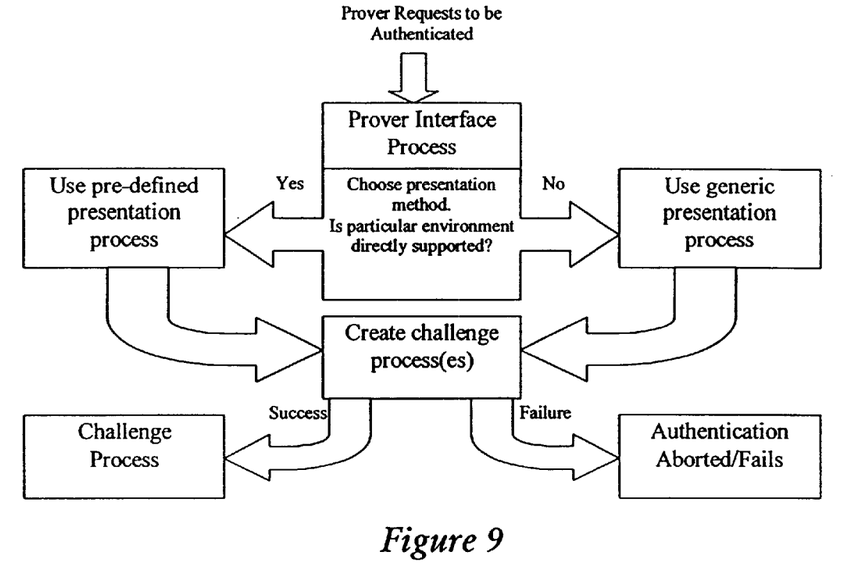
FIG. 9 is a flow chart illustrating the set-up of the Prover Interface and preparation to accept Prover responses to Challenges.

FIG. 9 further illustrates that, once initiated, the Prover Interface Process contains and presents Challenge(s) to the Prover in a meaningful way based on the Prover's selected environment and experiences so that the Prover may respond familiarly. As was discussed with the Prover Step Building Process, a Challenge could replicate the display of familiar objects that a user is requested to manipulate. Alternatively, the Prover may be presented a generic presentation as the standard, simplest method to present the Challenge (lowest common denominator approach) or a Prover pre-defined method that more closely matches the selected environment and experiences of the Prover.

For example, if the user has not selected a particular set of symbols to match his/her environment and experiences, then the display of a generic, familiar symbol, or set of symbols, such as a deck of cards, can be presented. The Presentation Process makes the determination based on the Prover's chosen environment and whether it's supported. The final step is to create the sub-processes that define the individual Challenges to be presented to the Prover. These individual Challenges help to satisfy the authentication requirements of a particular secure application. If any of the sub-processes cannot be created, the Process fails and the Process is aborted. Otherwise, the Challenge Process is initiated.

Challenge Process

Figure 10:
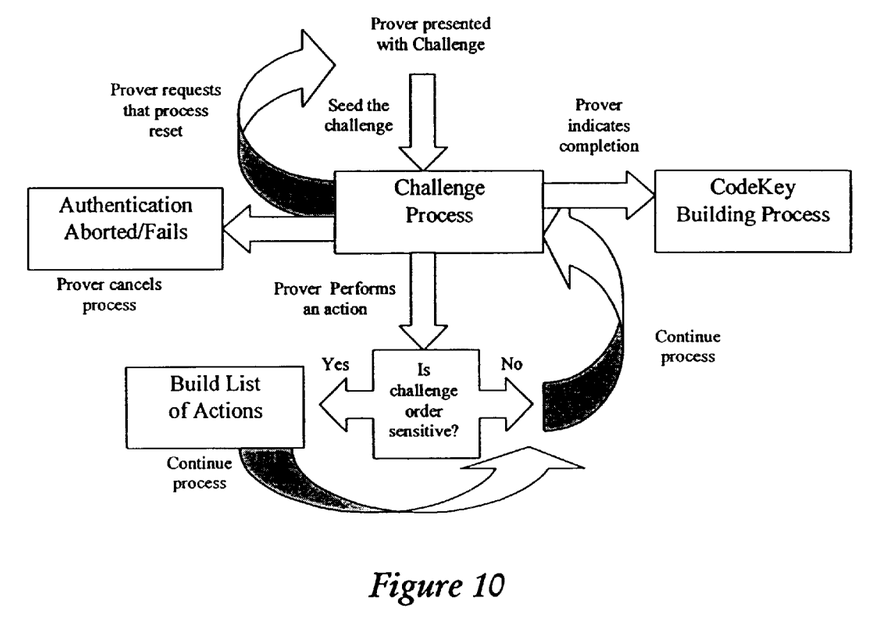
FIG. 10 is a flow chart illustrating the steps in presenting and processing Prover Challenges.

FIG. 10 depicts the initial steps that occur when the Prover is presented with a Challenge. The Challenge could be a single Challenge or a series of Challenges. The Challenge requires Prover responses(s) in order to continue the Process. The Challenge itself can be seeded with a random value in order to randomize the output of the Challenge and provide a session specific set of data.

The Challenge is presented as a familiar set of objects or symbols, similar to the display shown to choose the initial Prover Steps. Arranging, moving or sequencing the objects and symbols completes the Prover's actions or Prover Steps. The Challenge could also be order-sensitive, which indicates that a list of all actions (e.g., Prover Steps) be built and stored during the lifetime of a specific Challenge. The order of the Prover Steps would directly influence the outcome of the Challenge Process.

At any point during the Challenge Process, the Prover can cancel/abort the Process. Cancellation is by an explicit action on the part of the Prover. Cancellation aborts the Process and authentication fails. Also, at any point during the Challenge Process, the Prover can reset the Challenge. This allows the Prover to restart the process when the Prover makes an error while completing their Prover Steps. This returns the Prover to the start of the Challenge Process.

CodeKey Building Process

Figure 11:
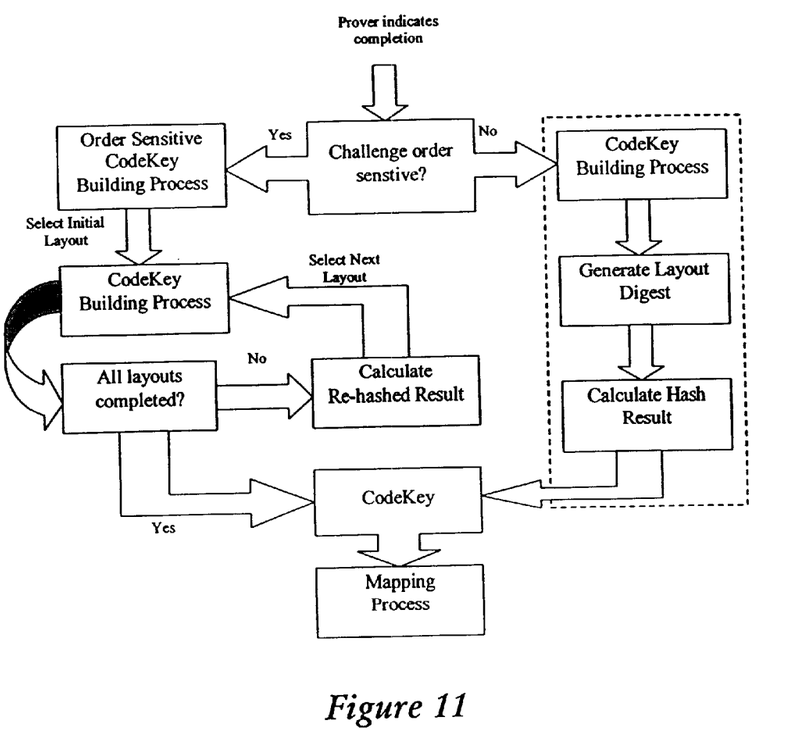
FIG. 11 is a flow chart illustrating the steps that take place in converting Prover Steps to a CodeKey.

When the Prover indicates completion of the Challenge Process, the CodeKey Building Process of FIG. 11 begins. Completion does not equate or indicate successful authentication. A CodeKey is generated based on processing the layouts generated by the Prover Steps in the Challenge Processes. As FIG. 11 shows, each Prover Step generates a layout that is processed in the CodeKey Building Process. Both order sensitive and non-order sensitive layouts can be generated. The conversion is specific to the type of Challenge, order sensitivity, arrangement of objects and sequence of Prover Steps.

For non-order sensitive Prover Steps, the CodeKey building process generates a layout Digest (similar to the Table of FIG. 4C) corresponding to the Prover Steps. The final layout is processed into a result, such as a String, that is used to build the CodeKey. Typically, the result or String is processed with a non-reversible one-way function, such as a one-way hashing function, to produce the CodeKey. This CodeKey will be used to decrypt the stored authentication information.

For order-sensitive Prover Steps, an order-sensitive CodeKey building process is followed, as shown in FIG. 11. This process selects the first in the series of layouts resulting from the Prover Steps in the challenge process. Next, the order-sensitive CodeKey building process converts the selected layout into a result, such as a String. Then, the next layout is selected in the order sensitive sequence. The previous result is processed with a nonreversible one-way function (e.g., a one-way hashing function) with the newly selected layout and is passed to the CodeKey building process. This process continues until the final layout in the sequence is processed (converted into the actual CodeKey by applying a non-reversible one-way function). The resulting CodeKey is used in the same manner as the CodeKey generated by the non-order sensitive CodeKey building process.

It should be understood that the above-described CodeKey building process is not limited to non-reversible one-way functions, but rather that one skilled in the art would contemplate additional encryption methodologies that can be used in the invention.

Note also that the String generated during the CodeKey building process may or may not be the same as the String stored on the user's computer. It is more secure, however, to have the String generated during the CodeKey building process be different from the String stored on the user's computer. The result that is the most important is whether the authentication information, after being decrypted by the CodeKey resulting from this String, satisfies the requirements of the secure application to be accessed. If the Challenge is not order sensitive, then only the final result or layout of the Prover Steps is important in determining the outcome of the Challenge Process (see FIG. 8). The Challenge Process continues until the Prover indicates completion or aborts the process.

The CodeKey Process ensures that the Prover Steps and layouts cannot be easily deduced. The CodeKey is never stored and could be unique for each application and authentication session. Once the CodeKey Building Process is completed, the results are fed to the Automatic Processes. Completion of the CodeKey Building Process does not indicate successful authentication in any way. It merely indicates that a specific CodeKey has been generated from the layout(s) that resulted from the Prover's Steps during the Challenge process.

Automatic Processes

Figure 12:
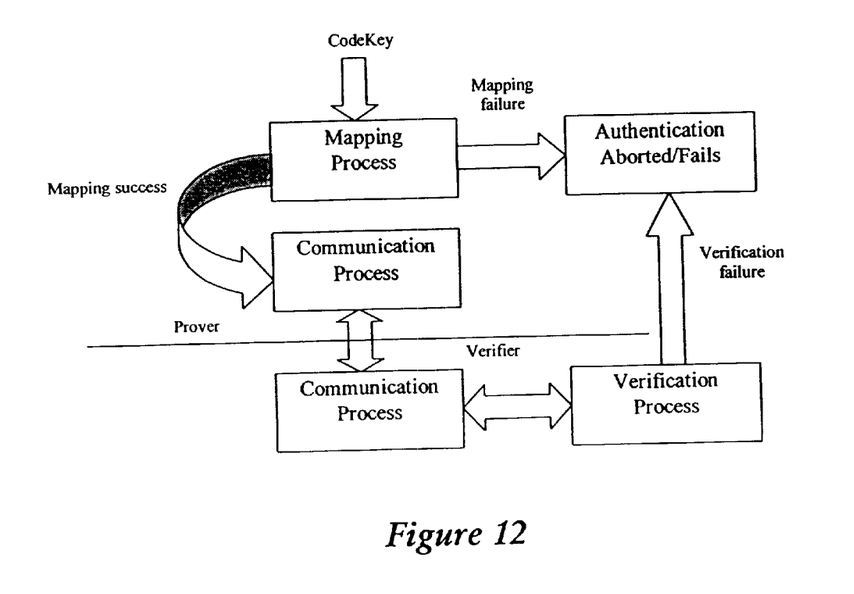
FIG. 12 is a flow chart illustrating the steps that take place automatically once a CodeKey based on Prover input has been generated.

The remaining steps in the Process occur automatically and require no further involvement of the Prover. FIGS. 7 and 12 depict a high-level overview of the steps that are involved.

The results of the CodeKey Building Process initiate the Automatic Processes. The appropriate authentication protocol and corresponding sub-process are selected based on the application being accessed. The Mapping process initiates the Communication Process with the Verifier and the subsequent Verification Process. If the CodeKey cannot be mapped then authentication fails and the overall process is aborted.

Mapping Process

Figure 13:
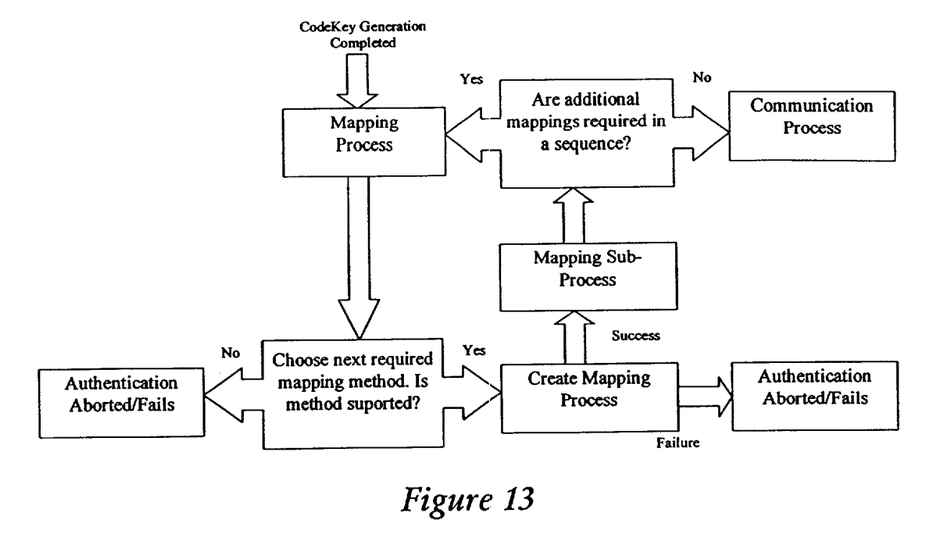
FIG. 13 is a flow chart illustrating how the Mapping Process selects and creates an application specific sub-process to complete authentication.

As shown in FIG. 13, the Mapping Process is initiated by the results of the CodeKey Building Process. An appropriate mapping sub-process is selected based on the application being accessed by the Prover and the type of authentication necessary for that application. Upon successful creation of a specific mapping sub-process, CodeKey(s) are fed to it for processing. If additional mappings, in a sequence of mappings, are required then the results of the mapping sub-process are fed back into the Mapping Process. If the creation of a specific mapping sub-process fails or if no appropriate mapping sub-process can be discovered, then the authentication fails and the overall Process is aborted. Otherwise, the results of the Mapping Process initiate the Communication Process.

Descriptions follow for some possible mapping sub-processes associated with specific authentication protocols. These include Legacy Name & Password (FIG. 14), Digital Signature/Certificate (FIG. 15), Zero Knowledge (FIG. 16), and External Authentication (FIG. 17). Other sub-processes could be added as alternative authentication protocols become available or are developed.

Figure 14:
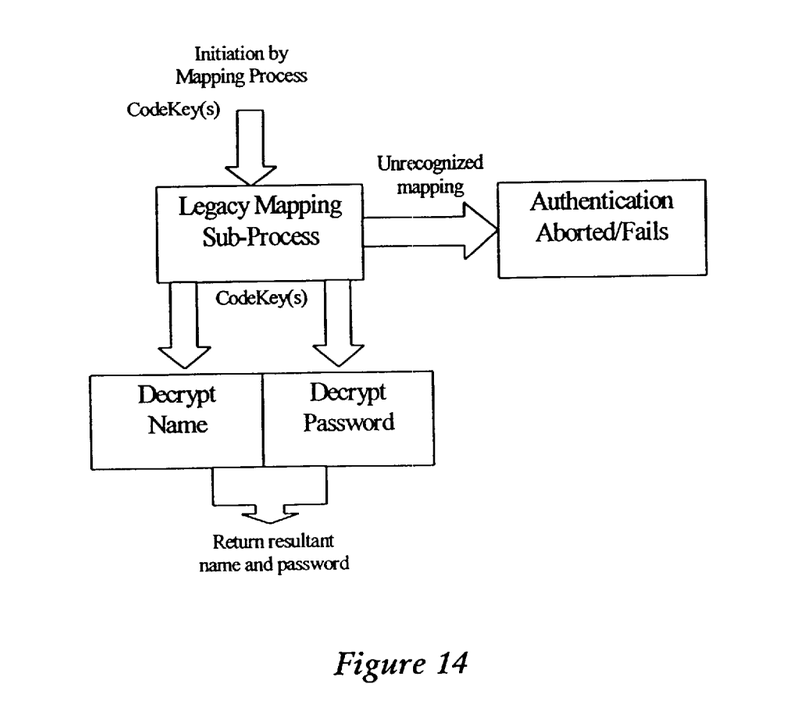
FIG. 14 is a flow chart illustrating the mapping subprocess for applications that rely on name and password for authentication.

FIG. 14 depicts the steps that are involved in the sub-process that supports traditional legacy name and password applications. The result of the CodeKey Building Process and/or another mapping sub-process initiates the sub-process. The prior steps in the Mapping Process can also supply additional information necessary for initiation of this sub-process. The results of this mapping sub-process are supplied back to the Mapping Process for use in the Communication Process. In this particular case, the results are a specific name and password pair that can be used in authentication. If the creation of this specific mapping subprocess fails or if the mapping itself is unable to complete for any reason, then authentication fails and the Process is aborted.

Figure 15:
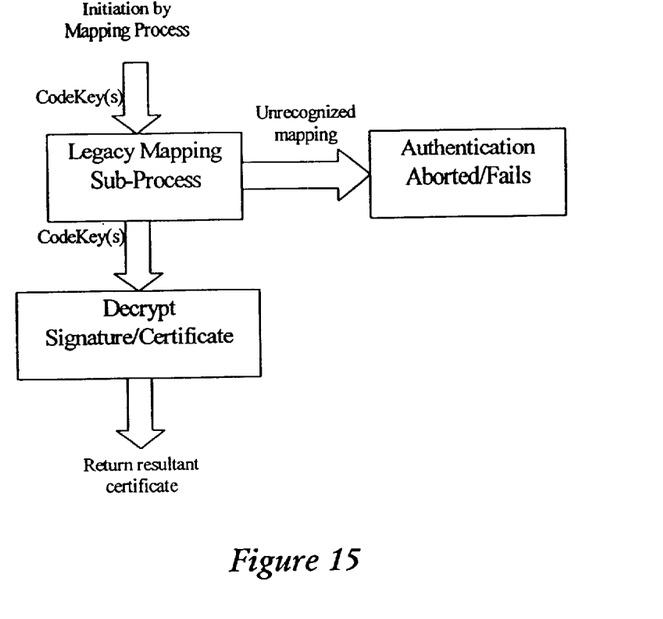
FIG. 15 is a flow chart illustrating the mapping sub-process for applications that rely on digital certificates and signatures and public keys for authentication.

FIG. 15 depicts the steps that are involved in the sub-process that would support the use of digital signatures or digital certificates. The result of the CodeKey Building Process and/or another mapping sub-process initiates the sub-process. The prior steps in the Mapping Process can also supply additional information necessary for the initiation of this sub-process. The results of this mapping sub-process are supplied back to the Mapping Process. In this particular case, the results of the sub-process are a specific digital certificate, signature, public and/or private key that can be used in authentication. If the creation of this specific mapping sub-process fails or if the mapping itself is unable to complete for any reason, then authentication fails and the Process is aborted.

Figure 16:
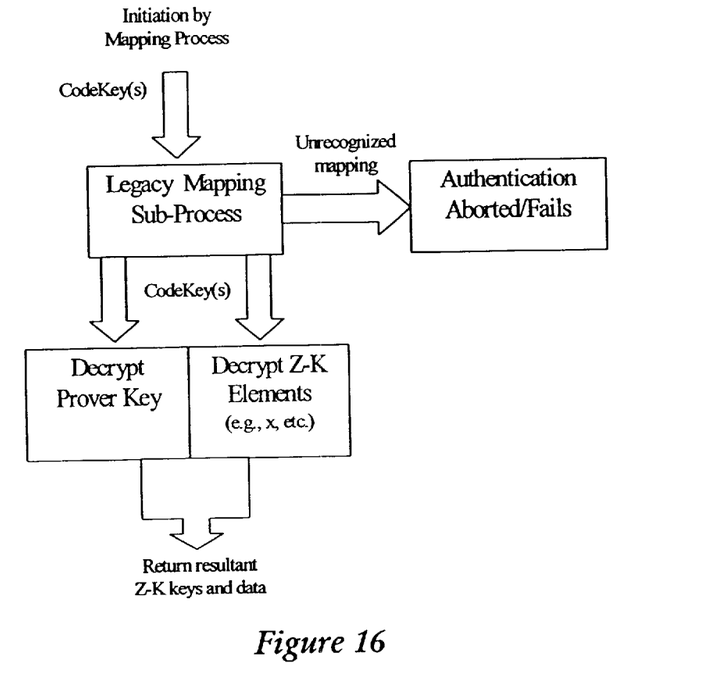
FIG. 16 is a flow chart illustrating the mapping sub-process for applications that rely on zero-knowledge for authentication.
Figure 17:
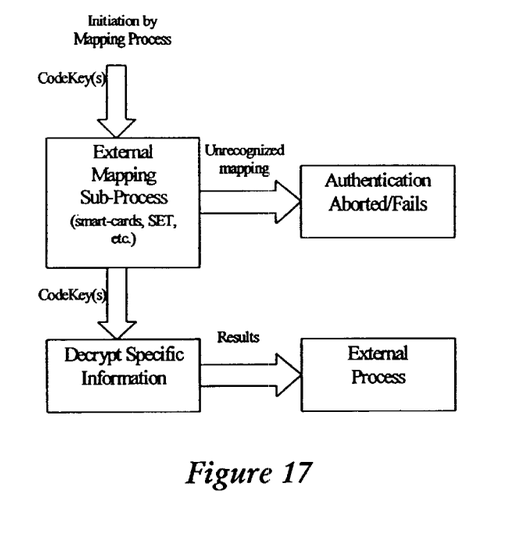
FIG. 17 is a flow chart illustrating the mapping sub-process for applications that rely on external processes for authentication.

FIG. 16 depicts the steps that are involved in the sub-process that would support zero-knowledge style authentication. The results of the CodeKey Building Process and/or another mapping sub-process(es) initiate the sub-process. The prior steps in the Mapping process can also supply additional information necessary for initiation of this sub-process. The results of this mapping sub-process are supplied back to the Mapping Process. In this particular case, the results of the sub-process are zero-knowledge keys and information that can be used in authentication. If the creation of this specific mapping sub-process fails or if the mapping itself is unable to complete for any reason, then the authentication fails and the Process is aborted.

FIG. 17 depicts the sub-process that supports external authentication based applications. The results of the CodeKey Building Process and/or another mapping sub-process (es) initiate the process. Prior steps in the Mapping Process can also supply additional information necessary for initiation of this sub-process. The results of this mapping sub-process are supplied to an external authentication process. Control of the authentication task is handed to this external process for completion. If creation of a specific mapping sub-process fails or if the mapping itself is unable to complete for any reason, then authentication fails and the Process is aborted.

Communication Process

Figure 18:
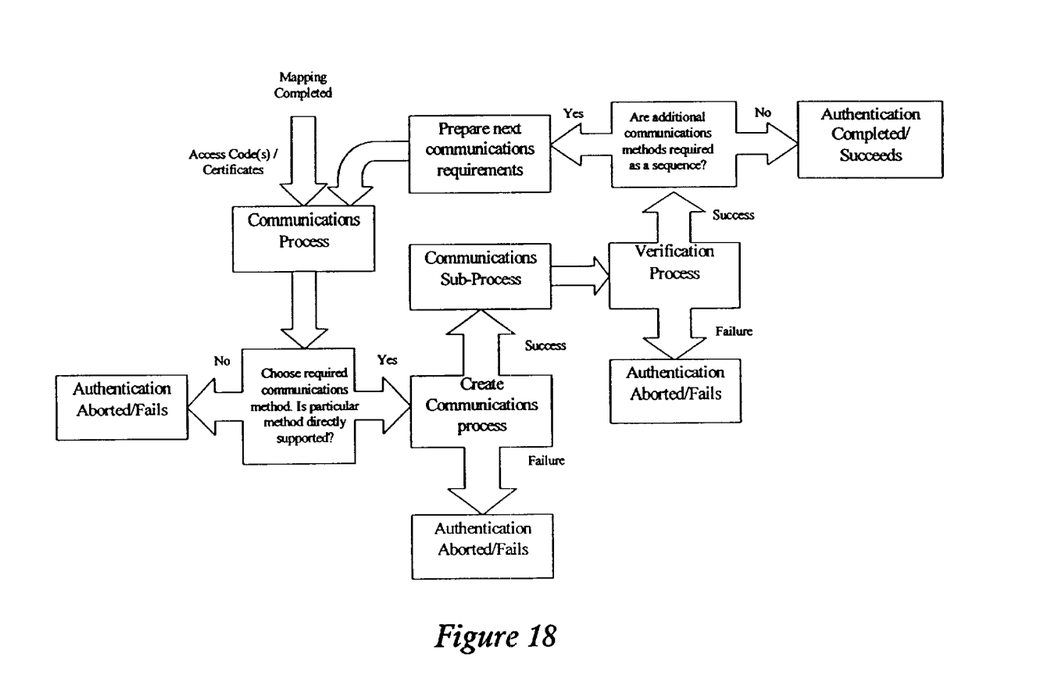
FIG. 18 is a flow chart illustrating the steps in communicating the Mapping Process results to the ultimate Verifier.

The Communication Process of FIG. 18 is the link between the Prover and the Verifier. The results of the Mapping Process initiate the Communications Process. This process leads to the final Verification Process and ultimate authentication conclusions.

An appropriate communications sub-process must be selected and created based on the application selected by the Prover at initiation, the type of authentication that is to occur and associated communications requirements. Examples of these communications subprocesses are described below. Upon successful creation of a specific communications subprocess, communication is initiated and mapping results are fed to it for processing. If additional mappings in a sequence of mappings are required, then the results of the current mapping sub-process are fed back into the Communications Process Loop. Otherwise, the results of the Communications Process initiate the Verification Process and the results of that process lead to the final authentication completion or failure.

At any point during the Communications Process, the Verification Process can indicate failure. In such a case, authentication fails and the Process is aborted. As long as the Verification Process indicates success, the sub-process(es) may continue as necessary. If the creation of a specific communications sub-process fails or if no appropriate communications sub-process can be discovered then the authentication fails and the Process is aborted.

Figure 19:
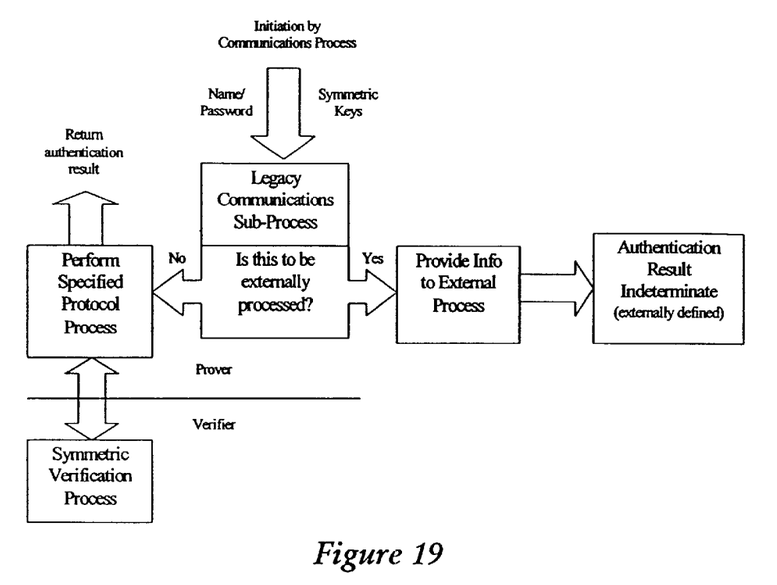
FIG. 19 is a flow chart illustrating the communication sub-process for legacy based authentication.

FIG. 19 depicts the steps that are involved in the Legacy/ Symmetric Communications sub-process. The results of the Mapping Process and/or other communications subprocess (es) initiate this process. The prior steps in the Communications Process can also supply additional information necessary for initiation of this sub-process. The results of this communications sub-process are supplied in the Communications Process after the Prover and Verifier perform an exhaustive symmetric verification process via the channel provided by this sub-process. The task of completing the authentication process can be given to an external authentication process and all control is relinquished to that process. If the creation of this specific communications sub-process fails or if the communication itself is unable to complete for any reason (such as failure to achieve a valid communications channel), then authentication fails and the overall Process is aborted.

Figure 20:
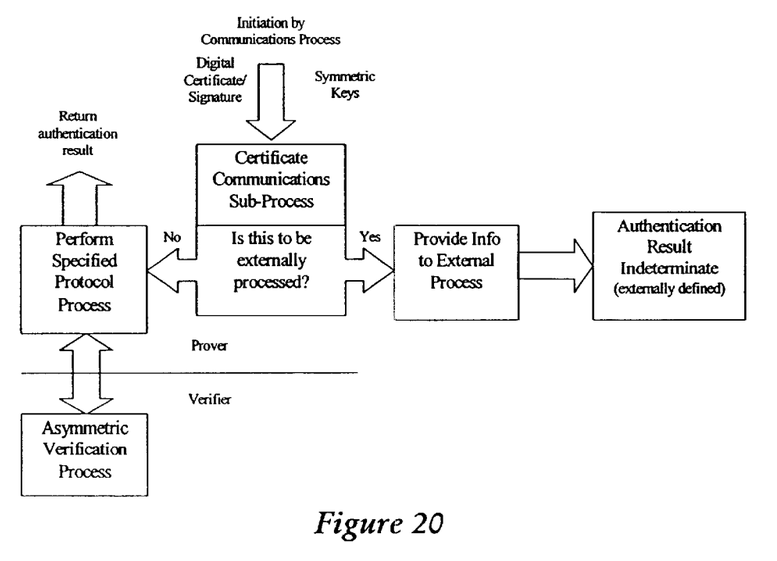
FIG. 20 is a flow chart illustrating the communication sub-process for certificate based authentication.

FIG. 20 depicts the steps that are involved in the Certificate/Asymmetric Communications sub-process. The results of the Mapping Process and/or another communications sub-process(es) initiate this process. The prior steps in the Communications Process can also supply additional information necessary for initiation of this sub-process. The results of this communications sub-process are supplied to the Communications Process after the Prover and Verifier perform an exhaustive asymmetric verification process via the channel provided by this sub-process. The task of completing the authentication process can be given to an external authentication process and all control is relinquished to that process. If the creation of this specific communications sub-process fails or if the communication itself is unable to complete for any reason (such as failure to achieve a valid communications channel), then authentication fails and the overall Process is aborted.

Verification Process

Figure 21:
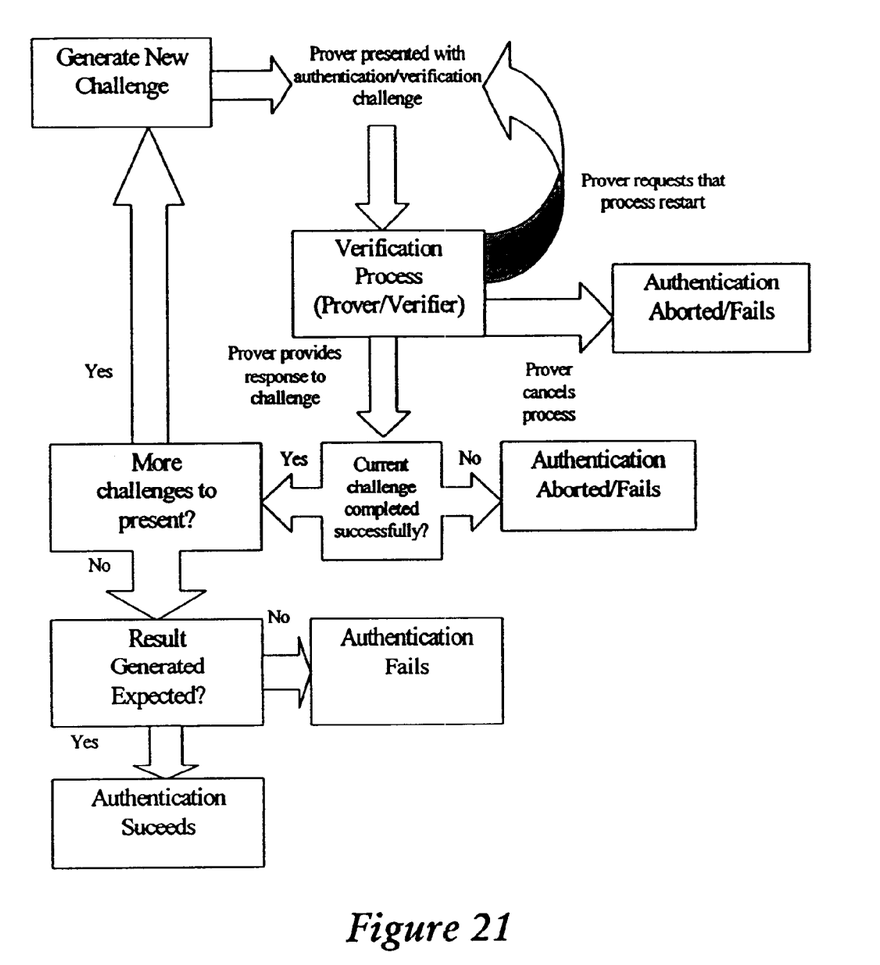
FIG. 21 is a flow chart illustrating the final steps in the Process to complete authentication.

FIG. 21 depicts the final Verification Process steps and their relationship to the authentication challenge. An automatic challenge/response process is initiated between the earlier Communication/Mapping Process and the Verification Process. The Communication/Mapping Process is presented with a particular challenge. In general, the challenge requires a response in order to continue the Process. The Verifier indicates whether the current Communication/Mapping Process response is correct or not and the Process proceeds accordingly. The challenge/response-handling methods of the Verification Process continue until the Verifier indicates completion or aborts the authentication process. When the Verifier indicates final completion of the challenge/response process, authentication succeeds or fails depending on if the Verifier has received sufficient responses to generate the Expected Result.

At any point during a particular Verification Process, the Prover can reset the challenge. This allows the Communication/Mapping Process to restart the process in those instances where the Prover makes an error. This returns to the start of this process. At any point during the Verification Process, the Verifier (as well as the Communication/Mapping Process) can cancel/abort the authentication process. The cancellation process is initialed by explicit action on the part of the Verifier and/or the Communication/Mapping Process. Cancellation aborts the authentication process and the Process fails.

What is claimed is:

1. A method for providing a user access to a verifier, said method comprising, storing in an encrypted form authentication information necessary to satisfy authentication requirements of said verifier, enabling said user to provide user input related to authentication, generating a code key based on said user input, decrypting said encrypted authentication information using said codekey to produce a result, and in response to said result satisfying said verifier, granting said user access to said verifier.

2. A method for providing a user access to a verifier, said method comprising, enabling said user to provide at least one prover step, generating a code key in response to said user performing said at least one prover step, and decrypting stored encrypted authentication information with said codekey to produce a result, and in response to said result satisfying authentication requirements of said verifier, granting said user access to said verifier.

3. The method of claim 2, wherein said stored encrypted authentication information is accessible by said verifier.

4. The method of claim 2, wherein said stored encrypted authentication information is stored at said user's location.

5. The method of claim 2, wherein said step of decrypting further comprises the step of mapping said result to a format specified by said verifier.

6. The method of claim 2 further comprising, permitting said user to repeat steps.

7. The method of claim 2, wherein said stored encrypted authentication information is seeded with a pseudo-random value.

8. The method of claim 2, wherein said stored encrypted authentication information comprises stored encrypted authentication information for a plurality of verifiers.

9. The method of claim 8, wherein said plurality of verifiers use the same result to satisfy said authentication requirements for each of said plurality of verifiers.

10. The method of claim 8, wherein each of said plurality of verifiers use different results to satisfy said authentication requirements for each of said plurality of verifiers.

11. The method of claim 2, wherein said generating step generates said codekey in response to said user performing at least two prover steps, wherein an order in which said user performs said at least two prover steps is irrelevant to determination of said codekey.

12. The method of claim 2, wherein said generating step generates said codekey in response to said user performing at least two prover steps, wherein an order in which said user performs said at least two prover steps is determinative of said step.

13. The method of claim 2, wherein said user performing said at least one step comprises manipulating a symbol.

14. The method of claim 2, wherein said user performing said at least one prover step comprises providing information regarding something said user has.

15. The method of claim 2, wherein said user performing said at least one prover step comprises providing information regarding something said user is.

16. The method of claim 15, wherein said something said user is comprises said user's finger print.

17. The method of claim 2, wherein said user performing said at least one prover step comprises providing information regarding something said user knows.

18. The method of claim 17, wherein said something said user knows is a alphanumeric password.

19. The method of claim 2 where said stored encrypted authentication information is stored with said user.

20. The method of claim 2, wherein said user performing said at least one prover step comprises providing something said user has.

21. The method of claim 20, wherein said something said user has is an identification card.

* * * * *

UNITED STATES PATENT AND TRADEMARK OFFICE
CERTIFICATE OF CORRECTION

PATENT NO.     : 6,327,659 B2
DATED          : December 4, 2001
INVENTOR(S)    : Boroditsky et al.

It is certified that error appears in the above-identified patent and that said Letters Patent is hereby corrected as shown below:

<u>Title page,</u>
Below Item [*], Notice, please add the following:
-- [*] Notice:   This patent is subject to a terminal disclaimer. --

Signed and Sealed this

Twenty-fourth Day of December, 2002

JAMES E. ROGAN
*Director of the United States Patent and Trademark Office*